J. S. WHITE.
RIDING ATTACHMENT FOR PLOWS.
APPLICATION FILED OCT. 25, 1909.
985,960.
Patented Mar. 7, 1911.
2 SHEETS—SHEET 1.
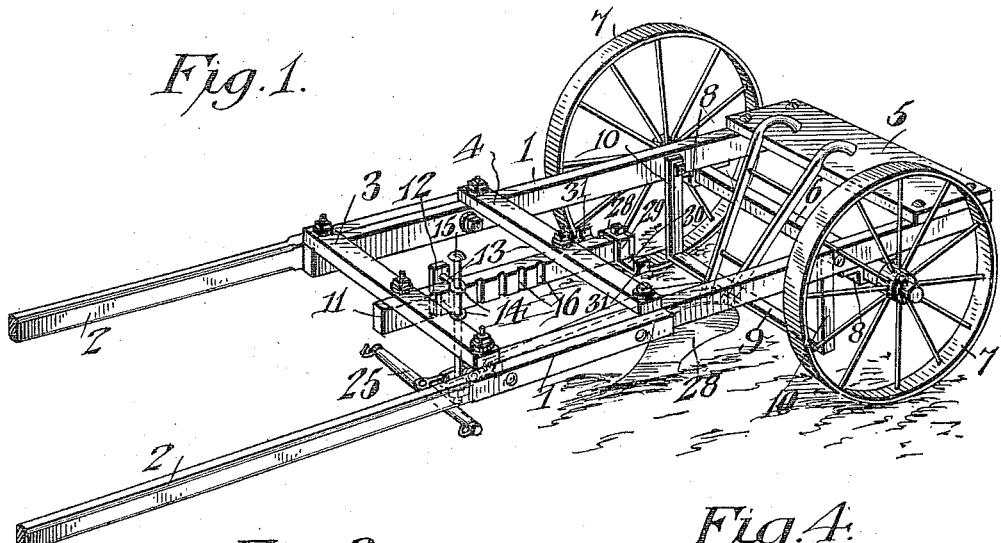
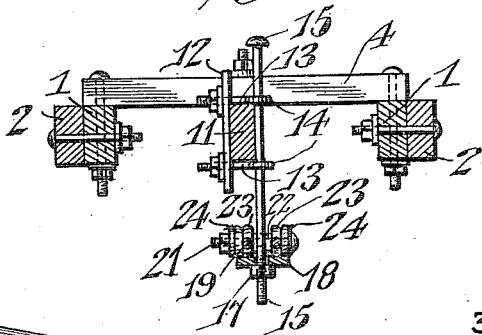
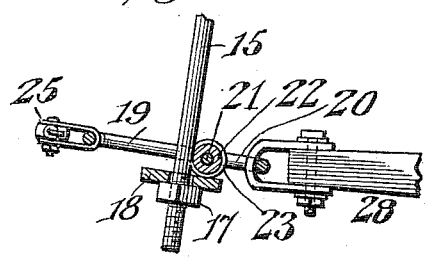
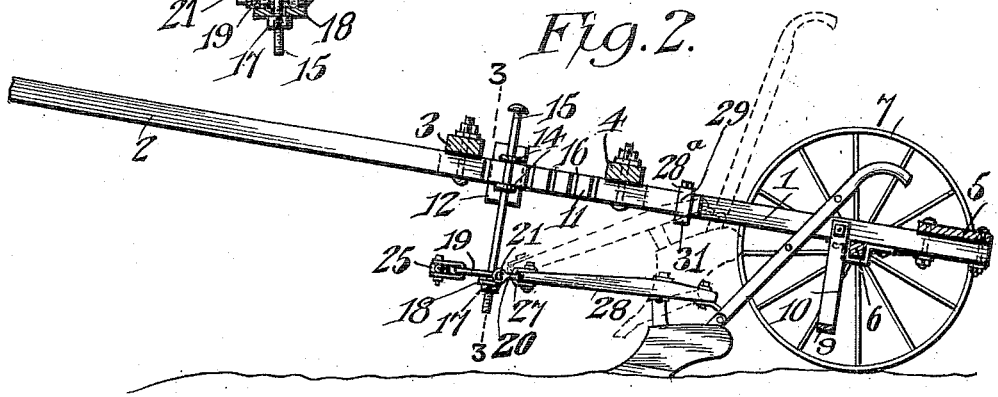
J. S. White, Inventor
Witnesses
Jas. K. McCathran
H. W. Riley
By C. G. Siggers
Attorney

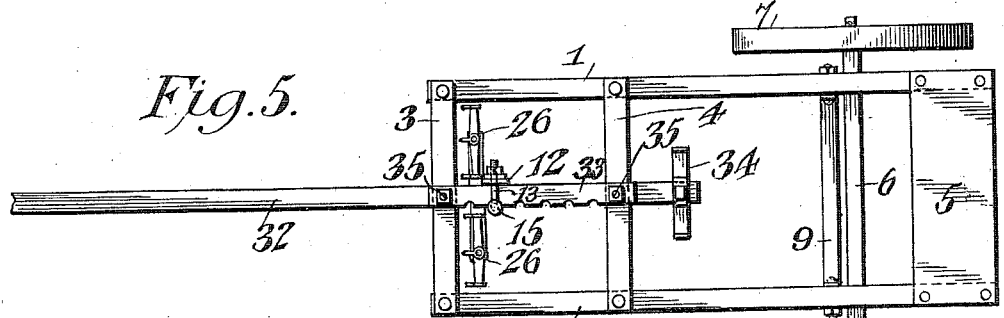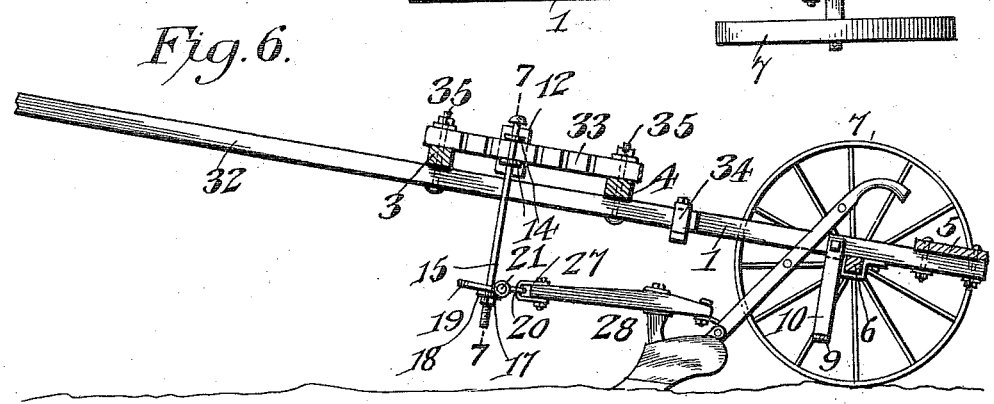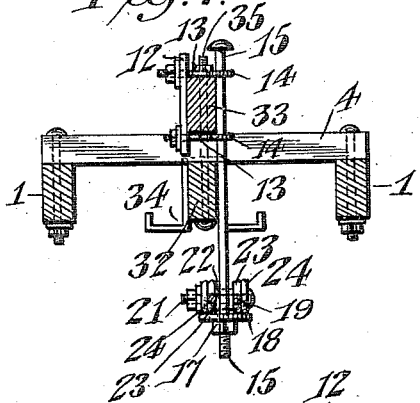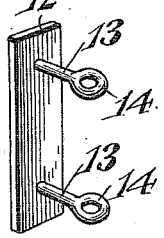

UNITED STATES PATENT OFFICE.

JESSE S. WHITE, OF ELIZABETH, MISSISSIPPI.

RIDING ATTACHMENT FOR PLOWS.

985,960.  Specification of Letters Patent.  Patented Mar. 7, 1911.

Application filed October 25, 1909. Serial No. 524,505.

*To all whom it may concern:*

Be it known that I, JESSE S. WHITE, a citizen of the United States, residing at Elizabeth, in the county of Washington and State of Mississippi, have invented a new and useful Riding Attachment for Plows, of which the following is a specification.

The invention relates to improvements in riding attachments for plows, etc.

The object of the present invention is to improve the construction of riding attachments for plows, and to provide a simple and comparatively inexpensive riding attachment of this character, adapted to be readily connected with any common walking plow to enable the operator to ride during the operation of plowing.

Another object of the invention is to provide a riding attachment of this character, designed also for use in connection with stalk cutters, fertilizer distributers, road and ditch graders, scrapers and analogous implements, and adapted to be readily adjusted to accommodate the same, and capable of enabling a plow to be easily and conveniently handled.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a sulky or riding attachment for plows, constructed in accordance with this invention, and equipped with a pair of shafts. Fig. 2 is a longitudinal sectional view of the same. Fig. 3 is a transverse sectional view, taken substantially on the line 3—3 of Fig. 2. Fig. 4 is an enlarged detail sectional view, illustrating the construction for connecting the plow beam and the draft animal with the attachment. Fig. 5 is a plan view, the attachment being equipped with a tongue for use in connection with a team. Fig. 6 is a longitudinal sectional view of the same. Fig. 7 is a transverse sectional view, taken substantially on the line 7—7 of Fig. 6. Figs. 8 and 9 are detail views of the coupling. Fig. 10 is a detail view of the hanger.

Like numerals of reference designate corresponding parts in all the figures of the drawings.

In the embodiment of the invention illustrated in Figs. 1 to 4 inclusive, the riding attachment comprises a wheeled frame 1, equipped with a pair of shafts 2 for the accommodation of a horse or other draft animal. The frame 1 is composed of parallel side bars connected at the front portion by transverse bars 3 and 4, and at the rear end by a seat board 5, secured to the upper edges of the side bars, but in practice the seat board will be equipped with a suitable seat for the accommodation of the driver.

The rear portion of the frame is supported upon an axle 6, having carrying wheels 7 and secured to the lower edges of the side bars by clips 8, or other suitable fastening means. The wheeled frame is also equipped with a foot rest 9, preferably constructed of metal and composed of depending sides 10, and a transverse connecting bottom or foot resting portion. The sides of the foot rest are secured by bolts, or other suitable fastening devices to the inner faces of the side bars of the frame. The seat board is spaced from the axle to permit the legs of the operator to extend downwardly in rear of the axle to the foot rest.

The transverse bars 3 and 4 are bolted or otherwise secured to the side bars, and they carry a longitudinal supporting bar 11, upon which a hanger 12 is adjustably mounted. The hanger 12, which may be arranged at different points along the bar 11, consists of an upright plate and upper and lower laterally extending arms 13, piercing the plate and provided at their outer ends with alined eyes 14 for the reception of a hanger rod 15, loosely passing through the said eyes 14 and interlocked with the supporting bar to hold the hanger against movement along the same. The arms, which are formed by eye bolts, have threaded terminals and are secured to the plate 12 by nuts, washers being interposed between the same and the plate, as clearly shown in Figs. 3 and 7 of the drawings. This construction provides a vertical adjustment of the rod. The supporting bar is provided at intervals with grooves 16, any one of which is adapted to receive the rod 15, and when the rod is arranged in a groove, the hanger will be retained in its adjustment on the supporting bar. The adjustment is provided to enable the attachment to be applied to plows and other instruments of different sizes.

The hanger rod, which is provided at its upper end with a head and at its lower end with a nut 17 and a washer 18, extends through a coupling composed of front and rear links 19 and 20 and a transverse connecting bolt or pivot 21 upon which a roller 22 is mounted. The links are provided at their adjacent ends with registering eyes 23 and 24, and the connecting bolt passes through the said eyes. The roller is in the form of a sleeve, and it is arranged on the bolt between the sides of the link and operates to maintain the same in spaced relation to prevent the links from drawing together. The hanger rod passes through the front link 19, which is connected with a swingletree 25 or a doubletree 26. The rear link 20 is secured to the clevis 27 of a plow 28. The rod permits the upward and downward movement of the plow and enables the same to be handled with the same facility as an ordinary walking plow. The roller is adapted to ride freely in the rod during such upward and downward movement of the plow. The links and the connecting pivot form a universal coupling and permit a vertical sliding movement and a vertical and horizontal swinging movement. The plow, however, may be maintained in a fixed position with relation to the riding attachment by any suitable means, if desired. The plow handles extend upwardly and rearwardly and are arranged in advance of the seat in convenient position to be grasped by the operator. The draft is applied to the front end of the plow beam, and the attachment is drawn through its connection with the plow by the rod.

The rear end of the longitudinal bar is equipped with a plow supporting bracket 28ª, constructed of suitable metal and consisting of a central approximately inverted U-shaped portion 29 and laterally extended supporting arms 30. The central portion saddles and is bolted or otherwise secured to the supporting bar, and the laterally extending arms have their terminals bent upward to provide outer lugs 31. The arms extend from opposite sides of the bar, and the plow beam may be hung on either arm in the position illustrated in dotted lines in Fig. 2 of the drawings to support the plow clear of the ground, so that it may be transferred from one point or place to another. When the plow is supported by the bracket, it is held against lateral or outward movement by the upwardly extending terminal lugs 31.

When the wheeled frame is equipped with a pair of shafts, as illustrated in Figs. 1 to 3 inclusive, the longitudinal supporting bar may be arranged either above or below the transverse bars 3 and 4, but when the wheeled frame is equipped with a tongue 32, the supporting bar 33 is preferably arranged above the transverse bars, the tongue being secured below the same and extending in rear thereof and forming a support for the bracket 34. The tongue and the supporting bar may be secured to the transverse bars by the same fastening means, the bolts 35 piercing all of the said parts. In applying the attachment to a plow, the wheeled frame is run to a position over the plow with the handles in proper position with relation to the seat. The hanger and the rod are then adjusted to position the coupling with relation to the clevis of the plow beam. The draft animal or animals may then be hitched to the plow and the attachment.

Having thus fully described my invention, what I claim as new and desire to secure by Letters Patent, is:—

1. A riding attachment of the class described including a wheeled frame, a longitudinal supporting bar carried by the frame, a hanger adjustable along the bar, a rod depending from and carried by the hanger, and a coupling supported by the lower end of the rod and adapted to be connected with a whiffletree and with a plow or other device.

2. A riding attachment of the class described including a wheeled frame, a longitudinal supporting bar carried by the frame, a hanger adjustable along the bar, a rod depending from and carried by the hanger, and a coupling supported by the lower end of the rod and adapted to be connected with a whiffletree and with a plow or other device, said coupling having a vertical sliding movement on the rod and a hinged movement with respect thereto to permit a plow to move upwardly and downwardly and also to be swung upward to an elevated position, and a support located adjacent to the rear end of the longitudinal bar for supporting a plow in an elevated position.

3. A riding attachment of the class described including a wheeled frame, a longitudinal supporting bar carried by the frame, a hanger adjustable along the supporting bar, a rod adjustably secured to the supporting bar by the hanger and adapted to be raised and lowered, and a coupling supported by the lower end of the rod and slidable upwardly and downwardly thereon and adapted to be connected with a whiffletree and with a plow or other device.

4. A riding attachment of the class described including a wheeled frame, a longitudinal supporting bar carried by the frame and provided at intervals in one of its side faces with grooves extending from the upper to the lower face of the supporting bar, a vertically adjustable rod depending from the supporting bar and fitted in one of the grooves thereof and adjustable along the said bar, a hanger also adjustable along the bar and provided with means for engaging the same and the rod for securing the latter in the said groove and also in its vertical adjustment, and a coupling supported by the lower end of the rod and adapted to be connected with a whiffletree and with a plow or other device.

5. A riding attachment of the class described including a wheeled frame having a pair of spaced shafts and provided with spaced transverse bars extending across the space between the shafts, a longitudinal supporting bar secured to the transverse bars and supported in the space between the shafts, a hanger adjustable along the bar, a rod depending from and carried by the hanger, and a coupling supported by the lower end of the rod and adapted to be connected with a whiffletree and with a plow or other device.

6. A riding attachment of the class described including a frame, wheels located at opposite sides of and supporting the frame, a longitudinal supporting bar located between the sides of the frame, a hanger having means for adjustably securing it to the supporting bar and adapted to be moved backwardly and forwardly along the same, a rod connected with and depending from the hanger, and a coupling mounted on the rod and adapted to be connected with a plow and carried by the hanger in the adjustment thereof to permit the plow to be connected with the frame at different points along the same.

In testimony that I claim the foregoing as my own, I have hereto affixed my signature in the presence of two witnesses.

JESSE S. WHITE.

Witnesses:
A. W. SCRUGGS,
C. C. THOMAS.

---

Copies of this patent may be obtained for five cents each, by addressing the "Commissioner of Patents, Washington, D. C."